July 17, 1956  N. V. GUSCHING  2,755,135
MIST LUBRICATOR

Filed April 29, 1953  2 Sheets-Sheet 2

INVENTOR
NAGLE V. GUSCHING

BY Allen A. Dickson
AGENT

United States Patent Office 2,755,135
Patented July 17, 1956

2,755,135

MIST LUBRICATOR

Nagle V. Gusching, Sidney, Ohio, assignor to The Monarch Machine Tool Company, a corporation of Ohio Application April 29, 1953, Serial No. 351,979

3 Claims. (Cl. 299—143)

Lubrication in modern high speed machines must be supplied in the correct quantity and in the correct places. This is particularly true of machines incorporating antifriction bearings on relatively high speed shafts where over lubrication will cause overheating and insufficient lubrication will cause destruction. To this end, applicant uses lubricant in the form of mist which settles on moving parts and properly lubricates all members in the usual power train.

Means of forming mist are generally old but in proper mist lubrication economy and simplicity are important factors, as well as the need to provide mist particles of the proper size and quantity. Intersecting streams of oil issuing from jets will cause mist but it is difficult to cause the stream paths to intersect unless the volume of oil flowing is very large, and thus inefficient. Another case is of a jet issuing against a surface, which also causes mist. In this case the mist particles are large and the amount of the flow reduced to mist is not great enough to consider this device efficient. Much of the oil issuing from the jet is not atomized but runs away in a solid stream. Higher pressures obviate some of these difficulties, but again render the device inefficient.

It is thus an object of this invention to provide a device that efficiently produces mist from oil under pressure in a manner that provides mist particles of the proper size.

It is another object of this invention to provide a simple and economically built device which accomplishes the purpose of providing mist for mist lubrication.

Other objects will become apparent upon inspection of the following specification and study of the attached drawings in which.

Figure 1:
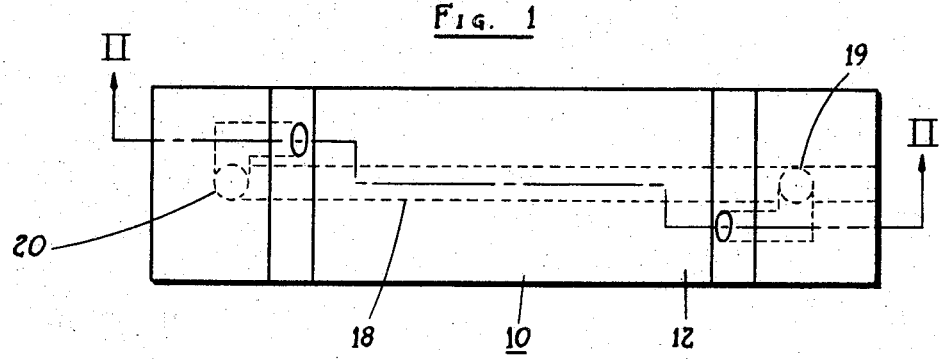
Figure 1 is a plan view of one embodiment of my invention.
Figure 2:
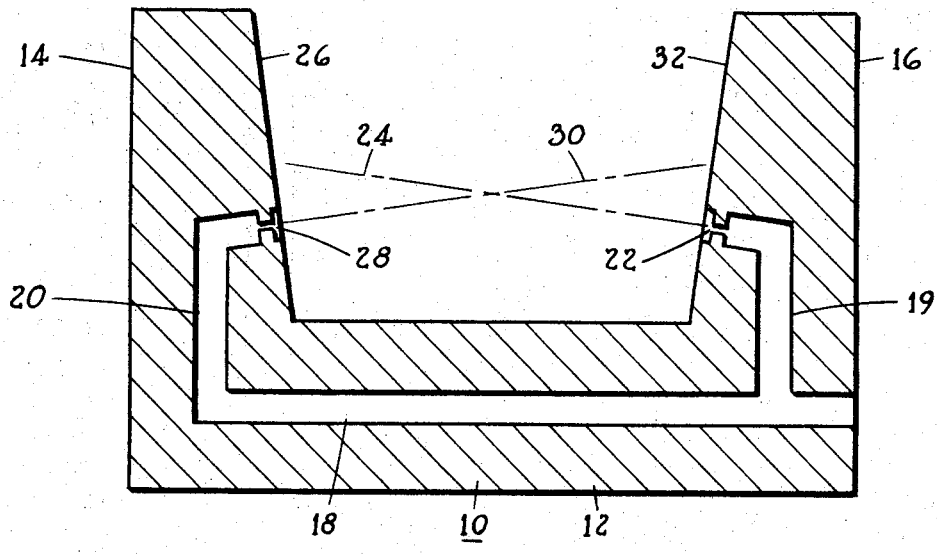
Figure 2 is a section taken generally along the line II—II of Figure 1.

Referring now to Figures 1 and 2, the mist lubricator comprises a body 10 having a generally straight base member 12 with two upstanding arms 14 and 16 located thereon at opposite ends thereof. Passageways or conduits 18, 19, and 20 are provided in the body 10 with passageway 18 connected to both passageways 19 and 20. Passageway 19 terminates an orifice 22 and when oil under pressure is supplied to passageway 18 it issues from the orifice 22 as a jet which moves freely in the air and follows path 24 to strike upon the inner face 26 of arm 14. A certain amount of the oil issuing from orifice 22 atomizes upon striking face 26 but a significant portion of the oil runs down the face 26.

Passageway 20 is terminated by an orifice 28 from which issues a jet of oil generally following path 30 through the air to strike face 32 on the inside of arm 16. Here again the oil runs down the face 32 and it will be seen that the oil will pass across the face of the jets. That is to say, the oil running down the face 32 will pass into the path of the oil issuing from jet 22. When this occurs both the oil running down and the jet itself will substantially atomize and the oil jet will become a properly divided mist of oil particles. The same result will occur at face 26 and the jet issuing from orifice 28. The jets 22 and 28 issue at an angle to, rather than parallel to, faces 32 and 26 respectively.

It should be noted that complete atomization does not occur but some oil continues to pass along paths 24 and 30 to continue supplying oil to run down into the paths of the jets issuing from orifices 22 and 28. It should be particularly noted from Figure 1 that the jets do not intersect each other in the air but are offset relative to each other.

Figure 3:
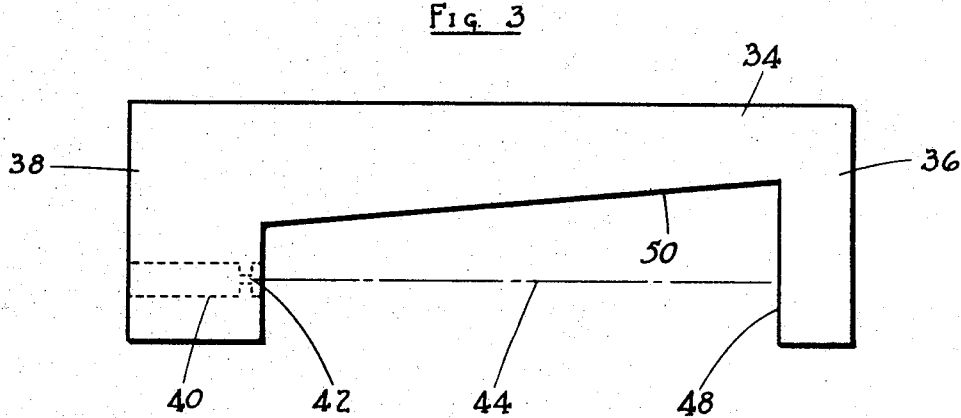
Figure 3 is a side elevation of another embodiment of my invention.

Referring now to Figure 3, another embodiment of the invention is seen. A body 34 is provided with arms 36 and 38. Arm 38 is provided with an oil supply passageway or conduit 40 through which oil under pressure is supplied and this passageway terminates in an orifice 42 which directs a jet of oil along path 44, which is away from arm 38 in which orifice 42 is mounted to impinge upon the inner face 48 of arm 36. As is well known from cases where impingement of this type occurs, the oil splashes around and atomizes to a small extent. Some of the splashing oil contacts the under face 50 of the body 34 and runs down the slope thereof until it drips over the jet issuing from orifice 42. Again when this occurs, the jet and the flow of oil from face 50 into the path 44 of the jet atomize causing mist particles of the proper size. Sufficient oil is unatomized and passes along path 44 to keep oil running down face 50 to pass into the path of the jet.

Figure 4:
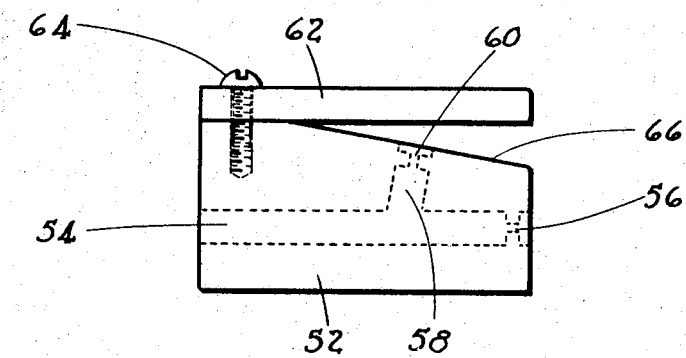
Figure 4 is a side elevation of a further embodiment of my invention.

Referring now to the embodiment of Figure 4, a body 52 is shown as having a passageway or conduit 54 which is supplied with oil under pressure. Passageway 54 terminates in an orifice 56 and side passageway 58, connected with passageway 54, terminates in an orifice 60. Located over the orifice 60 is a cover plate 62 which is held to the body 52 by fastening means such as screw 64. When passageway 54 is supplied with oil under pressure some of the oil issues from orifice 60 and some of it issues from orifice 56 creating a jet directed away from body 52. The oil issuing from orifice 60 is deflected from the under side of cover plate 62 and then runs down the top face 66 of the body 52 and thence runs into the path of the oil issuing from orifice 56. As was earlier described, droplets passing into the path of such a jet cause atomization of both the droplets and the jet into mist particles of the proper size for proper lubrication.

The embodiments shown and described are also effective with liquids other than oil.

While I have illustrated my invention in the above described preferred embodiments it can easily be seen that this invention is capable of further embodiments. Therefore I request that the scope of this invention be defined by the appended claims.

What I claim is:

1. In a device for producing mist, first and second surfaces arranged so that they substantially face each other, first and second orifices in said first and second surfaces, respectively, a conduit of substantially larger size than said orifices connected to both said orifices and arranged to be connected to a supply of liquid under pressure, said first and second orifices thus emitting jets of liquid when said conduit is supplied with liquid under pressure, said first orifice being directed so that its fluid jet impinges upon said second surface above said second orifice, said second orifice being directed so that its fluid jet passes the fluid jet issuing from said first orifice and impinges upon said first surface above said first orifice, whereupon fluid from said first and second orifices runs down said second and first surfaces to partially interrupt the jets issuing from said second and first orifices, respectively, to cause mist.

2. The structure of claim 1 wherein the liquid supply is lubricating liquid under pressure so that a mist of lubricating liquid is created.

3. In a device for producing mist, a plurality of surfaces, a plurality of orifices, said orifices being arranged to be connected to a common source of liquid under pressure, at least one of said orifices being in each of said plurality of surfaces and each of said orifices being directed toward another surface at a point on said another surface above the orifice in said another surface, said orifices being directed so that jets issuing therefrom when said orifices are supplied with liquid under pressure are uninterrupted by impingement with other jets, whereby liquid running down the surfaces partially interrupts the jets to cause the creation of mist.

References Cited in the file of this patent
UNITED STATES PATENTS

| | | |
|---|---|---|
| 1,540,805 | Reichenbach | June 9, 1925 |
| 1,583,996 | Reid | May 11, 1926 |
| 1,665,482 | Strong | Apr. 10, 1928 |
| 1,864,647 | Greer | June 28, 1932 |
| 1,868,632 | Edge | July 26, 1932 |
| 1,891,909 | Bills | Dec. 27, 1932 |
| 2,499,092 | Burnam | Feb. 28, 1950 |
| 2,530,671 | Wahlin | Nov. 21, 1950 |
| 2,532,711 | Goddard | Dec. 5, 1950 |
| 2,605,144 | Northup | July 29, 1952 |